US008506284B2

(12) United States Patent
Bergman

(10) Patent No.: US 8,506,284 B2
(45) Date of Patent: Aug. 13, 2013

(54) HOT ISOSTATIC PRESSING DEVICE

(75) Inventor: Carl Bergman, Västerås (SE)

(73) Assignee: Flow Holdings GmbH (SAGL) Limited Liability Company, Mezzovico (CH)

( * ) Notice: Subject to any disclaimer, the term of this patent is extended or adjusted under 35 U.S.C. 154(b) by 726 days.

(21) Appl. No.: 12/656,355

(22) Filed: Jan. 27, 2010
(Under 37 CFR 1.47)

(65) Prior Publication Data

US 2010/0186608 A1 Jul. 29, 2010

Related U.S. Application Data

(62) Division of application No. 10/504,712, filed as application No. PCT/SE03/00255 on Feb. 17, 2003, now Pat. No. 7,687,024.

(30) Foreign Application Priority Data

Feb. 20, 2002 (SE) ....................................... 0200487

(51) Int. Cl.
*B29C 43/10* (2006.01)
*B22F 3/15* (2006.01)

(52) U.S. Cl.
USPC ........ 425/405.2; 425/815; 432/199; 432/205; 432/233

(58) Field of Classification Search
USPC ...... 425/405.2, 815, 73–74, 77–78; 432/199, 432/205, 233, 249
See application file for complete search history.

(56) References Cited

U.S. PATENT DOCUMENTS

| | | | | |
|---|---|---|---|---|
| 1,923,729 | A * | 8/1933 | Hull | 264/652 |
| 4,532,984 | A | 8/1985 | Smith, Jr. | |
| 4,582,681 | A * | 4/1986 | Asari et al. | 419/49 |
| 4,756,680 | A | 7/1988 | Ishii | |
| 5,123,832 | A | 6/1992 | Bergman et al. | |
| 6,250,907 | B1 | 6/2001 | Bergman | |
| 6,514,066 | B1 * | 2/2003 | Bergman | 425/405.2 |
| 7,008,210 | B2 * | 3/2006 | Manabe et al. | 425/405.2 |

FOREIGN PATENT DOCUMENTS

| | | | |
|---|---|---|---|
| EP | 0 438 083 | A1 | 7/1991 |
| WO | WO 01/14087 | A1 | 3/2001 |

* cited by examiner

*Primary Examiner* — Richard Crispino
*Assistant Examiner* — Thukhanh Nguyen
(74) *Attorney, Agent, or Firm* — Harness, Dickey & Pierce, P.L.C.

(57) ABSTRACT

A method of cooling a load provided in a load compartment in a furnace chamber of a furnace of a hot isostatic pressing device includes releasing hot pressure medium from the load compartment. Cool pressure medium is provided for enabling it to fall through the released hot pressure medium outside the load compartment. The thus obtained mixed pressure medium is led into the load compartment. A hot isostatic pressing device includes a load compartment having an aperture near an upper portion thereof configured to vent warm pressure medium into a region surrounding the compartment and a conduit configured to introduce cool pressure medium into the region surrounding the compartment for mixing with the warm medium. The compartment also includes an aperture near a lower portion thereof configured to receive a mix of warm and cool pressure medium from the region surrounding the compartment.

30 Claims, 4 Drawing Sheets

HOT ISOSTATIC PRESSING DEVICE

CROSS-REFERENCE TO RELATED APPLICATIONS

This application is a divisional of U.S. patent application Ser. No. 10/504,712 filed on Jun. 8, 2005, issued as U.S. Pat. No. 7,687,024 on Mar. 30, 2010, which claims priority to and is a National Stage of International Application No. PCT/SE03/00255, filed on Feb. 17, 2003, and claims priority to Swedish Patent Application No. 0200487-7 filed on Feb. 20, 2002. The disclosures of the above applications are incorporated herein by reference.

TECHNICAL FIELD OF THE INVENTION

The present invention relates to a method of cooling a load provided in a load compartment in a furnace chamber of a hot isostatic pressing device, and to a hot isostatic pressing device.

BACKGROUND OF THE INVENTION

Hot isostatic presses are used in producing different types of articles, such as turbine blades for aircraft or artificial hip joints for implantation into persons. The press usually comprises a furnace provided with electric heating elements for increasing the temperature in the furnace chamber where the load, i.e. the articles, is being pressed in a loading space. After a finished pressing operation it is often important to rapidly cool the loading space so that the load therein will obtain the desired properties and so that grain growth is avoided or minimized. Furthermore, rapid cooling results in increased productivity since the load may be removed rapidly, thereby reducing the cycle time. However, it is also important that an even cooling throughout the loading space is achieved.

There have been attempts for cooling the loading space and the furnace chamber by injection of a cold gas directly into the loading space. Even though rapid cooling is obtained through this method, the disadvantage is that the load will become unevenly cooled, since gas that is substantially cooler than the gas in the loading space will flow through the load. This may lead to an uneven quality of the load and may even result in crack formation.

U.S. Pat. No. 5,123,832 discloses a hot isostatic press for achieving a more even cooling of the load, wherein a gas mixture is achieved by mixing, in an ejector, cold gas with hot gas from the furnace chamber. The temperature of the gas mixture which is ejected into the loading space is about 10% lower than the present temperature in loading space. The mixing of the cold gas and the hot gas in the ejector, requires a considerable throttling or restriction for providing a good mixing effect. The inlet for the mixed gas into the loading space is thus very small, typically 100 mm in diameter, whereas the diameter of the loading space is typically about 1.2 m. Even though a satisfactory cooling may be achieved, this construction also has drawbacks. During the pressing operation, when the furnace chamber is to be heated, the heating of the furnace chamber, and the loading space in particular, would become extremely uneven because of the small inlet area to the loading space, unless heating elements are provided on the side of the furnace chamber. In many cases it is desirable to only have heating elements at the bottom portion of the furnace chamber, for, inter alia, reasons such as simplicity and cost-saving. Thus, there remains a need for a simple alternative which provides good mixing and which does not have the above constructional limitations.

SUMMARY OF THE INVENTION

An object of the present invention is to provide a method and a device for hot isostatic pressing, which provide an even cooling of a load compartment in a furnace chamber, and which alleviate the drawbacks of the prior art.

Another object of the invention is to provide a method and a device for hot isostatic pressing, which is suitable also for a furnace lacking heating elements on the side of the furnace.

These and other objects, which will become apparent in the following, are achieved by a method and a hot isostatic pressing device as claimed in the appended claims.

The present invention is based on the insight that a good mixing of cool pressure medium with hot pressure medium released from the load compartment in a furnace chamber is obtainable without the use of special mixing devices. In other words a passive mixing may be used, in which the cool pressure medium, unaided or unforced, mixes with the hot pressure medium. The thus mixed pressure medium is introduced into the furnace chamber. This means that the actual mixing process is achieved by the movements of differently tempered pressure media, i.e. by self-convection.

The advantage of allowing the mixing to be performed independently of special mixing arrangements, such as a throttle of an ejector or pumps or fans is, among other things, that maintenance and operating costs are limited. Further advantage will become apparent in the following.

The term “cool” pressure medium has a relative meaning and is to be understood to refer to a pressure medium having a temperature that is lower than the temperature of a heated pressure medium being present inside the furnace chamber. Consequently, a “hot” pressure medium is a pressure medium that has been heated before or during the actual pressing operation in the furnace chamber, and that has a relatively higher temperature than the cool pressure medium. The term mixed pressure medium is to be understood to mean a pressure medium which has been obtained through mixing of the cool and the hot pressure media, and which thus has a temperature somewhere between those of the hot and cool pressure media.

It has been found particularly advantageous to mix the pressure media by self-convection. This may be achieved by allowing the relatively cool pressure medium to fall through the released relatively hot pressure medium. If the fall or drop of the cool pressure medium is from a certain height the cool and hot pressure media will be well mixed, as regards temperature. The well mixed pressure medium will thereafter be returned to the load compartment, and will thus have a somewhat lower temperature than the present temperature in the load compartment. The difference in height thus drives the flow of pressure media, i.e. self-convection.

After the mixed pressure medium has been returned to the furnace chamber for cooling the load, it will be released from the load compartment and mixed again with a pressure medium having a comparatively lower temperature then the newly released pressure medium, and then will once more be returned to the load compartment. This cycle will thus steadily reduce the temperature in the load compartment and the furnace chamber, achieving an even temperature reduction of the load.

The loop for the flow of the mixed pressure medium is preferably arranged so that the inlet into the load compartment lies below the zone to which the relatively cool pressure medium is delivered. Thus, the cool pressure medium will, due to its high density, fall from a high level, through the released hot pressure medium and mix therewith, to a lower level, and thereby an even tempered mixed pressure medium may be directed into the load compartment at the lower level. This is obviously an easy and practical solution. However, it is conceivable to arrange the inlet elsewhere, as long as the pressure media have been allowed to be well mixed, and thereafter possibly pumped up to a higher level.

The fall or drop of the relatively cool pressure medium is to be dimensioned so that this pressure medium is well mixed, from a temperature point of view, with the released hot pressure medium before the mixture is introduced back into the load compartment. It has been found that a good mixing effect is obtainable if the cool pressure medium is delivered at a level corresponding to half the height of the load compartment and thus drop through the released hot pressure medium towards a level corresponding to the bottom of the load compartment. A load compartment may typically have a height of 500 mm, wherein half the height would correspond to a drop of 250 mm. Suitably, the cool pressure medium is delivered at an even higher level, such as at a level near the top portion of the furnace chamber for ensuring good mixing.

A good mixing of the differently tempered pressure media is also dependent on the ratio of the cool pressure medium to hot pressure medium. A suitable ratio is 1:4. However, a lower amount of the cool pressure medium is also possible. The amount of cool pressure medium to be mixed into the hot pressure media should be controlled so as to avoid far to rapid and uneven cooling of the load.

The relatively hot pressure medium is suitably released from the furnace chamber at the top portion of the furnace chamber, so as to enable an even heat transfer from the pressure medium to the entire load. Thus, pressure medium is introduced through the bottom portion of the furnace chamber and, after having worked its way across the load, is released at the top portion of the load compartment.

The relatively cool pressure medium may be supplied in different ways. One way is to, throughout the cooling process, supply fresh cool pressure medium from an external source. An alternative is to cool down a part of the mixed pressure medium per se. In other words, after cool pressure medium has been delivered from an external source and then mixed with the hot pressure medium outside the load compartment, one part of this mixed pressure medium is led into the load compartment, while another part is diverted, preferably out from the furnace chamber, and cooled down. The diverted and cooled down pressure medium is thereafter recycled and used for mixing with new released relatively hot pressure medium. The new mixed pressure medium may again be split into two parts, and so on. A combination of the two alternatives is also possible, that is to use both an external supply of cool pressure medium and the recycled diverted type, throughout the entire cooling process.

A device according to the invention may, apart from a furnace chamber, suitably include a standard heat-insulating casing which is arranged inside a pressure vessel and which encloses the furnace chamber. The above described splitting or diverting of the flow of mixed pressure medium is suitably realised by diverting means such as an aperture provided in the heat-insulating casing, through which part of the mixed pressure medium may exit to the outside of the casing. The aperture is preferably located at a lower level than the level of the inlet to the load compartment. As part of the mixed pressure medium has passed to the outside of the heat-insulating casing, it may be cooled down in different ways, such as by means of a heat exchanger, a labyrinth passage with water-cooled walls or the like. A passageway finally brings back the pressure medium for yet another mixing action with released hot pressure medium. The pressure vessel is suitably provided with a valve in a conduit for disposal of excess pressure medium.

The cool pressure medium may be fed or delivered in many different ways before mixing with the hot pressure medium. It may e.g. be fed by a motor-driven pump mounted at the bottom of pressure vessel, or by a fan, or by any other suitable feeding means. The essential issue is that the cool pressure medium is enabled to fall from a certain height. Another essential issue concerning the cool pressure medium is to avoid having direct contact with the pressed articles or load, to be cooled down in the load compartment. One way is to feed the cool pressure medium through a conduit arranged outside the load compartment. Another way is to lead the cool pressure medium in a shielded manner, such as through a standpipe, through the load compartment from the bottom portion to the top portion thereof, thereby preventing the cool pressure medium from mixing with hot pressure medium inside the load compartment but allowing mixing with hot pressure medium outside the load compartment at the top portion thereof This central arrangement has the advantage that a straight conduit may be used which delivers the cool pressure medium so that it may easily spread in all radial directions and thus mix with hot pressure medium that has exited from different areas around the circumference of the load compartment wall.

Above the load compartment, but below an inner roof of the above mentioned heat-insulating casing, a control means may be provided for controlling the flow of pressure medium from a space, which is defined by the casing and said inner roof, to an area close to a side wall of the casing. The control means is preferably realised as comprising a shield that substantially shields the load compartment from said space. An advantageous configuration of the shield resembles to a general cone-shape, i.e. the shield slopes from its centre down to its circumference. A similar shield configuration is shown in WO 01/14087. The configuration according to the present invention enables an effective self-convection, by feeding the cool pressure medium to the space, above the centre of the shield, which thus is at a higher level than the level at which the peripheral part of the shield is located in an area near the wall of the casing. Because of this inclination of the shield the cool pressure medium will be driven down towards the wall of the casing and will effectively be mixed with the hot pressure medium. It should be noted that the actual mixing may start already above the shield in said space, if the hot pressure medium outlet of the load compartment opens to said space. However, the mixing may also take place after the cool pressure medium has left said space and reached the wall of the casing and there begins to drop through hot pressure medium, which has been released from the side of the load compartment defining wall. In the later case, the falling pressure medium will create an under-pressure which forces pressure medium inside the load compartment to be laterally extracted.

The cool pressure medium is preferably delivered to the space between the shield and the inner roof by means of a standpipe that extends in the furnace chamber upwards and that is provided with a mouth or nozzle, or several nozzles such as short branch pipes, above said shield for delivering relatively cool pressure medium to said space. The standpipe may suitably be arranged to extend along the central longitudinal axis of the furnace chamber and up through a central opening provided in the shield. That central opening may also serve as the outlet for hot pressure medium from the load compartment, which means that the diameter of the standpipe is smaller than the diameter of the central opening so as to allow hot pressure medium to pass through that central opening. The hot pressure medium may also exit at a location between the shield and the side wall of the load compartment. An alternative to the central arrangement of the standpipe is one or more standpipes outside the furnace chamber, with the mouths or nozzles of the standpipes arranged around the circumference of the furnace chamber. Such mouths may be in the form of restriction holes provided in a circular channel that is arranged around the load compartment.

As have been described earlier, a good mixing effect is obtainable also if the cool pressure medium is dropped from e.g. half the height of the load compartment. This may be realised by means of cool pressure medium conduits outside the load compartment or by means of a central standpipe, arranged inside the load compartment, said standpipe having branches to and through the side wall of the load compartment.

A great advantage of the present invention is that the mixing may easily and efficiently be performed well before the thus mixed pressure medium is introduced into the load compartment. Consequently, it is not necessary to limit the inlet to a small area such as the one of the construction shown in U.S. Pat. No. 5,123,832. On the contrary, it is possible to make use of a much larger inlet area distributed over the bottom of the furnace. The invention allows the inlet area, i.e. the area through which pressure medium may enter into the load compartment, to be typically around 30% of the bottom cross-sectional area of the load compartment. Not only does this solution provide the desired controlled cooling of the load compartment and the furnace chamber, but it also makes it possible to work with heating elements arranged only below the load compartment, for heating action during the actual pressing operation. Naturally, the invention does not prevent heating elements from being used at the side of the furnace chamber.

The pressure medium used in the present invention is suitably a gas, preferably an inert gas, such as argon, which is used both for transferring heat to the load before and during pressing, and for cooling the load after pressing. However, it is also possible to use a liquid, such as oil, as said pressure medium.

DETAILED DESCRIPTION OF THE DRAWINGS

Figure 1:
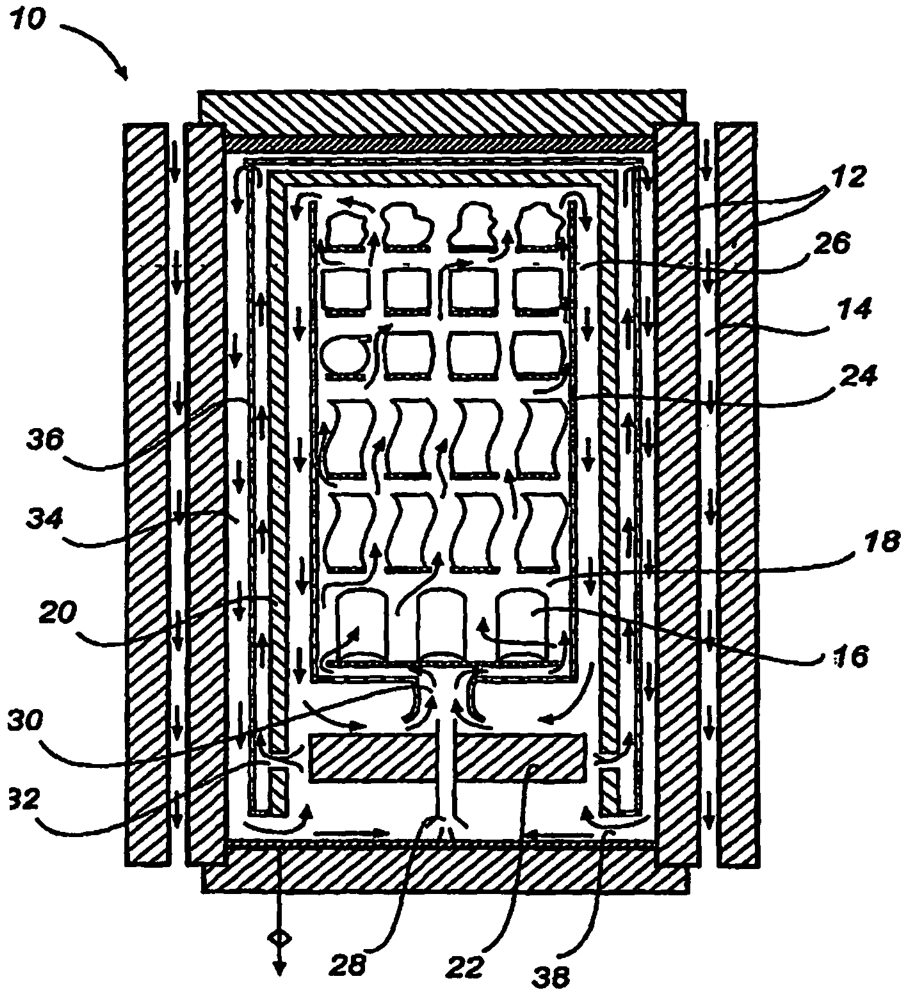
Fig. 1 RELATED ART
FIG. 1 illustrates a prior art hot isostatic press.

FIG. 1 illustrates a prior art hot isostatic press 10. The known hot isostatic press 10 has a traditional pressure vessel wall 12 which is provided with a channel for water cooling. Articles 16 are loaded in a loading space in a furnace chamber 18. The furnace chamber is surrounded by a heat-insulating mantle 20 and a bottom insulating plate 22. A basket 24 is arranged in the furnace chamber 18 around the articles 16 in the loading space so that a gap 26 is formed between the basket 24 and the heat-insulating mantle 20. Two ejectors 28, 30 are arranged respectively below and above the bottom insulating plate 22. The heat-insulating mantle 20 is provided with openings 32 in its lower part. Between the heat-insulating mantle 20 and the pressure vessel wall 12 a space 34 is formed. In the space 34 a sleeve 36 is inserted and is provided with an opening in its upper part and an open lower part 38. The open lower part 38 is situated below the opening 32 in the heat-insulating mantle 20. Gas from the cooling loop in the space 34 along the pressure vessel wall 12 is sucked in to the lower ejector 28. The lower ejector 28 provides the upper ejector 30 with its propellant flow of relatively cool gas. The upper ejector 30 is arranged above the bottom insulating plate 22. In the upper ejector 30 warm gas from the gap 26 is sucked into the ejector 30 and mixed with the propellant flow of relatively cool gas. The upper ejector 30 is arranged below the loading space and the gas is injected from below. As can be seen from the figure, the upper ejector 30 is necessary for achieving a good mix of the gases. Furthermore, only a limited inlet area may be used for injecting the thus mixed gas. Also, this limited area has a drawback in the heating of the load during the actual pressing operation. In order to accomplish an even heating of the loading space in the furnace chamber 18, it is necessary to provide heating elements (not shown) on the lateral side of the furnace chamber 18.

Figure 2:
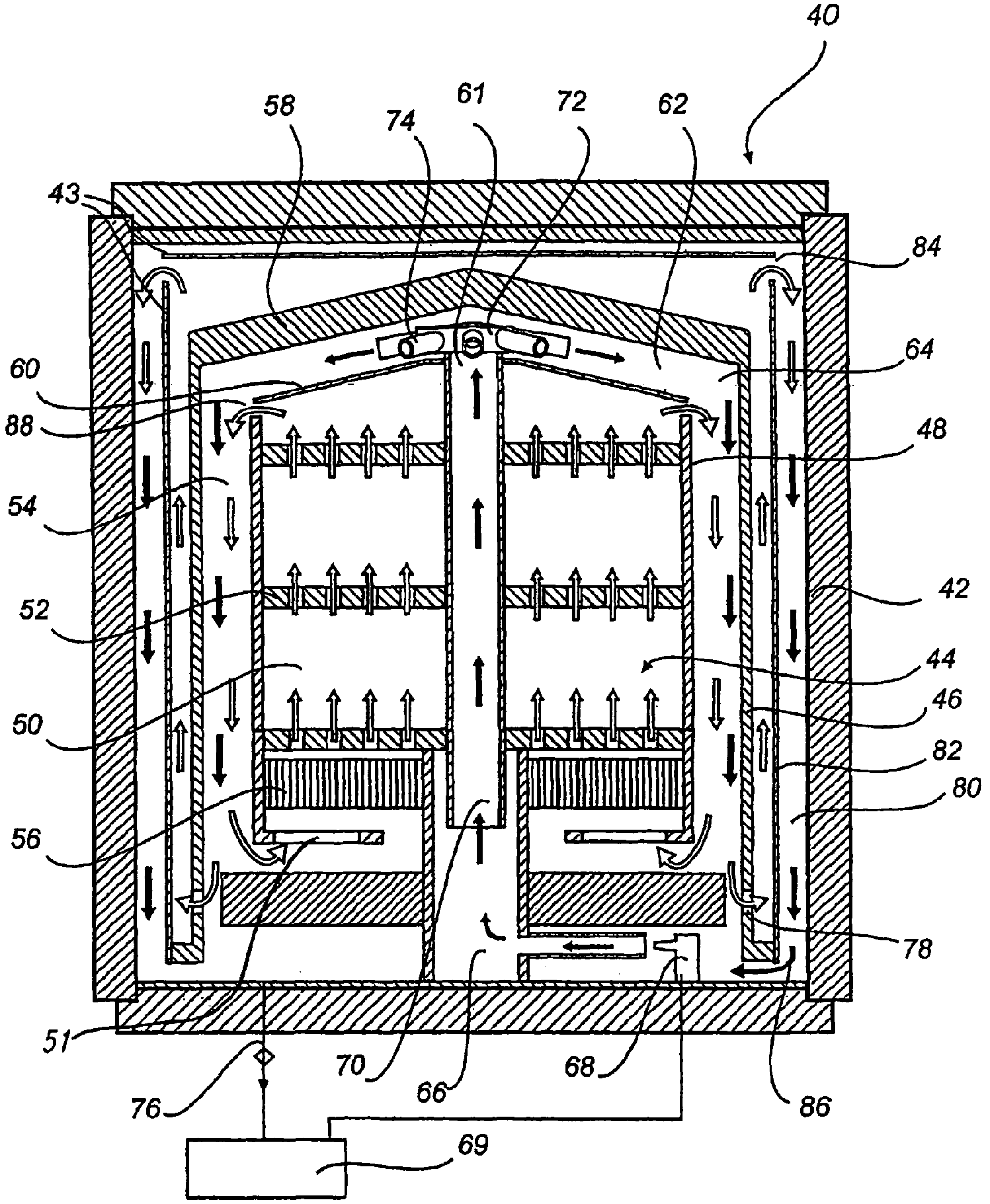
FIG. 2 illustrates schematically a pressure vessel of a hot isostatic press according to an embodiment of the present invention.

FIG. 2 illustrates schematically a pressure vessel 40 of a hot isostatic press according to an embodiment of the present invention. FIG. 2 is mainly a cross-sectional view of the pressure vessel 40. The pressure vessel 40 comprises a cylindrical pressure vessel wall 42, which may be provided with channels for cooling water (not shown). The pressure vessel wall 42 surrounds a furnace 43. Inside the furnace 43, a furnace chamber 44 is surrounded by a heat-insulating casing 46 or mantle. A basket 48 is arranged in the furnace chamber 44 and defines a load compartment 50 in which articles are loaded (the articles are not shown for the sake of clarity). The outside of the basket 48 is preferably coated with an insulating material for keeping a good temperature difference between the inside of the basket 48 and the outside of the basket 48. The interior of the basket is provided with grids or perforated shelves 52 for locating the articles at various levels in the load compartment 50 and for allowing the gas to flow up past them through the load compartment 50. The basket 48 is arranged so that a gap 54 is formed between the basket and the heat-insulating casing 46. At the lower portion of the load compartment 50 heating elements 56 are provided for heating gas and thereby the articles to be pressed. Above the basket 48 and the load compartment 50 but below an inner roof 58 that forms part of the heat-insulating casing 46, a shield 60 is provided for controlling the flow of gas from a space 62, which is defined by the casing 46 and said inner roof 58, to an area 64 close to a side wall of the casing 46. The shield 60 substantially shields the load compartment 50 from said space 62. The shield 60 has a sloping shape or somewhat of a cone-shape or a frustum of a cone. The shield 60 slopes from its centre, which is arranged concentrically with the central axis of the basket 48 or the press itself, down to its circumference near the side wall of the heat-insulating casing 46.

A piping arrangement 66 is in communication with a pump 68 or an ejector which delivers cool gas from a an external gas system 69. The piping arrangement 66 comprises a standpipe 70 which extends through the load compartment 50, along the central axis of the basket 48, from the bottom portion of the basket 48 to a level above the top portion of the basket 48, more precisely through a central opening 61 in the sloping shield 60 and above the sloping shield 60. The standpipe 70 communicates with a spreader 72 that is provided above the shield and that comprises several short branch pipes 74, evenly spaced around the circumference of the spreader. The short pipes 74 are thus directed so as to point radially away from the spreader 72 and the central axis. A connection 76 is provided at the bottom portion of the press for discharging excess gas or for introducing gas.

The heat-insulating casing 46 is as in the prior art provided with openings 78 in its lower side portion. Also, between the heat-insulating casing 46 and the pressure vessel wall 42 a space 80 is formed. In the space 80 a sleeve 82, as in the prior art, is inserted and is provided with an opening 84 in its upper portion and an open lower portion 86. The open lower portion 86 is situated below the opening 78 in the heat-insulating casing 46.

A cooling operation to be performed subsequent to a completed pressing operation will now be described. In order to cool the load compartment 50 and the articles contained therein, cool gas is mixed with hot gas in the following manner. Cool gas is pumped by means of the pump 68 from a cool gas source, up through the centrally arranged standpipe 70, to the spreader 72 where the cool gas will be delivered to the space 62 above the shield 60. Cool gas is illustrated with black arrows. The cool gas, having higher density than the surrounding gas, will fall down along the shield 60 to said area 64 near the heat-insulating casing 46 and into the gap 54 between the basket 48 and the heat-insulating casing 46. Hot gas that is present in the load compartment 50 is released, or will rather become sucked out from the load compartment 50 through an opening 88 or outlet between the shield 60 and the top of the basket 48. Hot gas is illustrated with white arrows. The cool gas will continue to fall through the hot gas that is present in the gap 54, and that is continuously released from the load compartment 50. The gases will thus mix and this mixed gas will be at a lower temperature than the released hot gas, such as typically 10% lower in .degree. C. The ratio between the amount of cool and hot gas for mixing may typically be 1:4, or an even larger difference. Compared to the prior art, in the furnace 43 according to the present invention a relatively large part of the furnace 43 is made use of for the actual mixing of the cool and hot gases. Instead of using a small constriction in which the gases are mixed, a volume or gap 54 in the form of a circular column around the basket 48 is used for a passive mixing by means of self convection.

One part of the mixed gas is returned to the load compartment 50 after having passed thorough the switched off heating elements 56 at the bottom portion of the basket 48. Another part of the mixed gas is diverted so as to exit through the openings 78 in the heat-insulating casing 46 and to travel up along one side of the sleeve 82, pass through the opening 84 in the sleeve, and then return down along the other side of the sleeve 82 and the pressure vessel wall 42, said pressure vessel wall 42 being provided with suitable cooling means such as a water channel. This diverted part of the mixed gas will therefore be cooled down even more as it passes next to the pressure vessel wall 42 and is suitably returned to the pump 68 for being pumped into the piping arrangement 66 as cool gas. It should be noted that the outer cooling loop is only used when gas has been pumped through the piping arrangement 66.

For the sake of clarity it has only been illustrated that the hot gas exits at an outlet or opening 88 between the shield 60 and the basket 48. However, it is also possible to allow hot gas to be released at the central opening 61 of the shield 60, if e.g. the outside diameter of the standpipe 70 is smaller than the diameter of said central opening.

During heating and pressing there is no need for gas to be diverted to the outside of the heat-insulating casing 46. As can be seen from the figure, the inlet area to the load compartment 50 at the bottom portion thereof is quite large. Even though the invention is mainly related to the cooling of the load, it also provides an advantage as far as heating of the load is concerned. The large inlet area allows the furnace chamber 44 and the load to be satisfactorily heated by the heating elements 56 arranged below the load compartment 50, and thus there is no necessity for arranging heating elements 56 on the lateral side of the load compartment 50, i.e. around its circumference. Thus, when articles situated in the load compartment 50 are to be pressed, the heating elements 56 below the load compartment 50 are switched on and the external gas system 69 (having storage and compressors) will deliver gas through the connection 76, such as argon, and compress it so that a high pressure of typically 300-5000 bar is achieved in the load compartment 50 of the furnace chamber 44. The gas that enters the load compartment 50 will pass through the large area occupied by the heating elements 56, wherein an even heating of the articles in the load compartment 50 is obtained.

Figure 3:
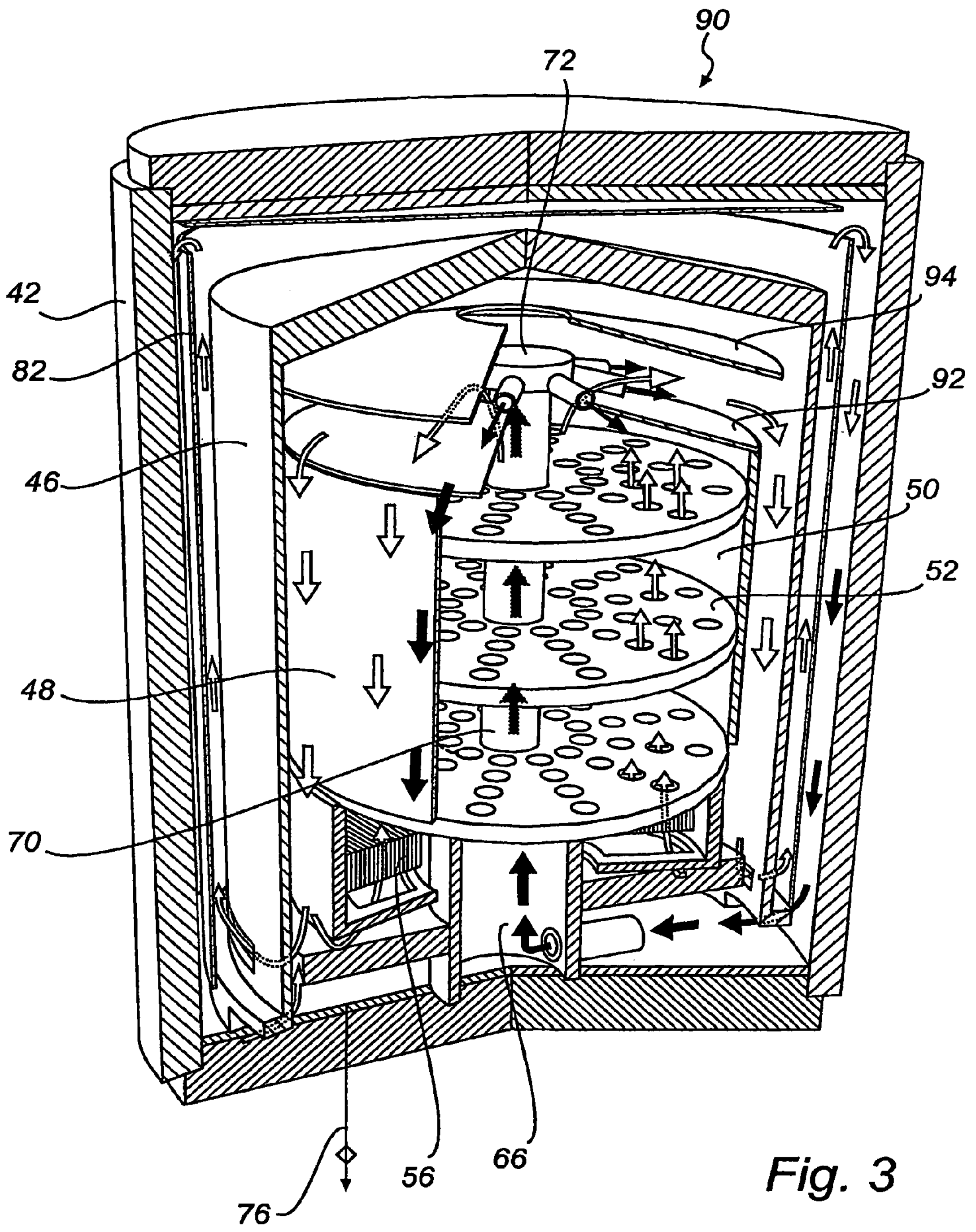
FIG. 3 illustrates schematically a pressure vessel of a hot isostatic press according to another embodiment of the present invention.

FIG. 3 illustrates schematically a pressure vessel 90 of a hot isostatic press according to another embodiment of the invention. FIG. 3 is a cut-away perspective view of the pressure vessel 90. The structural details that correspond to those of the pressure vessel 40 in FIG. 2 have been given the same reference numerals as the details in FIG. 2. Thus, it can be seen that the pressure vessel 90 has a generally cylindrical shape. The grids or perforated shelves 52 in the load compartment 50 are circular and provided with perforations or through-holes.

The pressure vessel 90 illustrated in FIG. 3 differs from the one illustrated in FIG. 2 in that it is provided with two shields, a lower shield 92 and an upper shield 94, above the basket 48. The periphery of the lower shield 92 is placed in direct contact with the upper circular rim of the basket 48. Thus, no gas is allowed to exit between the basket 48 and the lower shield 92. However, in an alternative design, the periphery may be open so as to allow gas to pass between the basket 48 and the lower shield 92. The upper shield 94 is placed concentrically above and at a distance from the lower shield 92. The upper shield 94 has essentially the same structural shape as the lower shield 92. This double shield arrangement ensures a good spreading of the cool gas to the lateral side wall which forms part of the heat-insulating casing 46. The standpipe 70 and the basket 48 are suitably made-of stainless steel, while the inner wall of the heat-insulating casing 46 is usually made of molybdenum. Steel has a higher coefficient of thermal expansion than molybdenum. This coefficient difference may cause a difference in vertical movement, such as 60 mm, of the steel standpipe 70 in relation to the heat-insulating casing 46 during change of temperature when heating the furnace chamber. The upper shield 94 is suspended from the heat-insulating casing 46, the inner wall of which is usually made of molybdenum. The steel standpipe 70 will therefore move in relation to the upper shield 94 but not in relation to the lower shield 92, which is applied to the steel basket 48.

Figure 4:
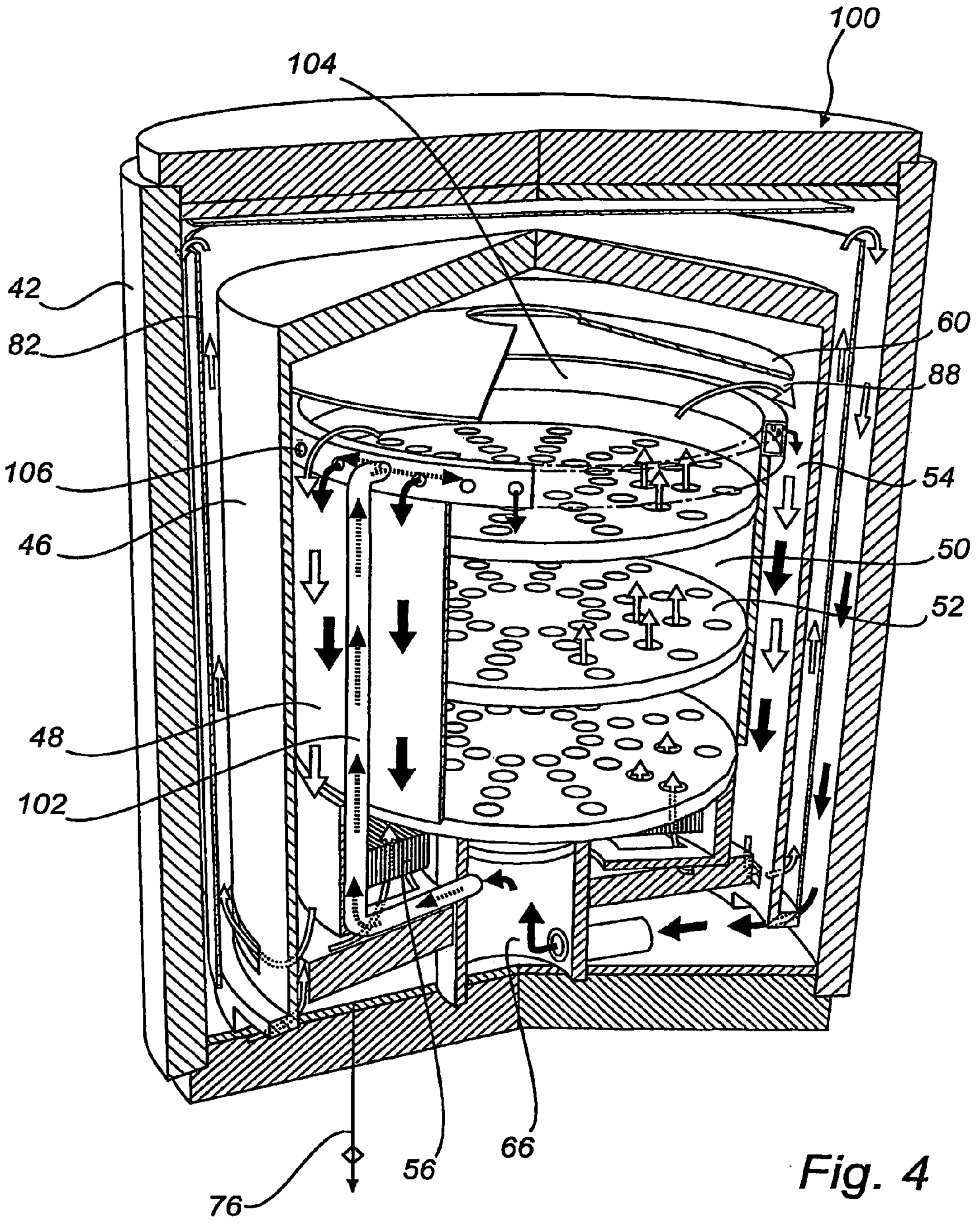
FIG. 4 illustrates schematically a pressure vessel of a hot isostatic press according to a further embodiment the present invention.

FIG. 4 illustrates schematically a pressure vessel 100 of a hot isostatic press according to a further embodiment the present invention. The same reference numerals are used for structural details corresponding to the details in FIGS. 2 and 3. In this embodiment the cool gas is lead to the drop height by means of a pipe 102 which is lead along the outside of the basket 48. The pipe 102 communicates with a distribution ring 104 which is provided with many restriction holes 106 evenly spaced around its outside circumference. Cool gas that is led to the distribution ring 104 will thus be forced out through the restriction holes 106 to the cylindrical gap 54 between the basket 48 and the heat-insulating casing 46. In the gap 54 the cool gas will mix with hot gas, which has passed from the load compartment 50 through an open area 88 between the basket 48 and the sloping shield 60 into the gap 54. Even though the distribution ring 104 is provided at the top of the basket 48, it would also be conceivable to arrange it at a lower height. The important thing is that the cool gas will drop through the hot gas a distance that is sufficient for obtaining a well mixed gas, and that the actual mixing is performed outside of the load compartment 50.

It should be noted that numerous modifications and variations can be made without departing from the scope of the present invention defined in the accompanied claims.

Thus, it is to be understood that the drawings are merely schematical illustrations for the purpose of elucidating the principles of the invention. Obviously, all structural elements of the different embodiments of the invention are not shown in the drawings. The different details and features, such as openings and apertures, may have alternative dimensions and locations.

What is claimed is:

1. A hot isostatic pressing device, comprising:

a load compartment for arranging articles to be pressed;

an outlet of the load compartment for enabling hot pressure medium to exit the load compartment;

a feeding device configured to feed cool pressure medium through the load compartment to a space above the load compartment and below an inner roof of a heat insulating casing at a level that enables the cool pressure medium to fall through and mix with the released hot pressure medium; and an inlet of the load compartment for enabling thus obtained mixed pressure medium to be led into the load compartment.

2. The device as claimed in claim 1, wherein said outlet is located at a top portion of the load compartment and said inlet is located at a bottom portion of the load compartment.

3. The device as claimed in claim 1, wherein a mouth of said feeding device, from which cool pressure medium is delivered, is provided at a higher level than a level of said inlet.

4. The device as claimed in claim 3, wherein said mouth is provided at a level above the load compartment.

5. The device as claimed in claim 1, wherein the load compartment is arranged in a furnace chamber, the furnace chamber being enclosed by a heat-insulating casing that is arranged inside a pressure vessel, wherein a control device which is arranged between the load compartment and an inner roof of the casing defines a space between itself and said inner roof, the control device being arranged to control the flow of pressure medium from said space to an area close to a side wall of the casing.

6. The device as claimed in claim 5, wherein said control device includes a shield that substantially shields the load compartment from said space, wherein the feeding device is arranged to deliver cool pressure medium to said space at a higher level than the level at which a peripheral part of the shield is located in an area near the wall of the casing, thereby preventing cool pressure medium from mixing with hot pressure medium inside the load compartment.

7. The device as claimed in claim 6, wherein said feeding device includes a standpipe that extends in the load compartment upwards and that is provided with at least one mouth above said shield for delivering cool pressure medium to said space.

8. The device as claimed in claim 6, wherein said outlet is provided between the shield and a side wall of the load compartment.

9. The device as claimed in claim 6, wherein said outlet is an opening provided in the shield.

10. The device as claimed in claim 1, further comprising:

a diverter configured to divert part of the mixed pressure medium from the rest of the mixed pressure medium;

a cooling device configured to cool the diverted part of the mixed pressure medium; and a recycling device configured to recycle the diverted part of the pressure medium as a cool pressure medium to be mixed with new hot pressure medium that exits through said outlet.

11. The device as claimed in claim 5, further comprising:

a diverter configured to divert part of the mixed pressure medium from the rest of the mixed pressure medium;

a cooling device configured to cool the diverted part of the mixed pressure medium; and a recycling device configured to recycle the diverted part of the pressure medium as a cool pressure medium to be mixed with new hot pressure medium that exits through said outlet, wherein said diverter comprises an aperture in the casing through which part of the mixed pressure medium may exit to the outside of the casing, and wherein said cooling device and said recycling device comprise a passageway from said aperture to said feeding device.

12. The device as claimed in claim 1, wherein at least one mouth of said feeding device, from which cool pressure medium is delivered, is provided outside a circumference of the load compartment.

13. The device as claimed in claim 1, wherein said pressure medium is a gas.

14. The device as claimed in claim 13, wherein the gas is an inert gas.

15. The device as claimed in claim 14, wherein the inert gas is argon.

16. A device, comprising:

a pressure chamber;

a load compartment positioned within the pressure chamber and configured to receive items to be pressure treated;

a first aperture in a wall of the load compartment configured to vent, at a first height near an upper portion of the load compartment, warm pressure medium to a first region surrounding the load compartment; and a conduit having a mouth, positioned at a second height near the upper portion of the load compartment, configured to introduce cool pressure medium to the first region.

17. The device of claim 16, wherein the second height is higher than the first height.

18. The device of claim 16, wherein the first aperture is one of a plurality of first apertures configured to vent, at the first height, warm pressure medium to the first region.

19. The device of claim 16, further comprising a second aperture configured to receive, at a third height, below the first and second heights, a mixture of the warm and cool pressure mediums from the first region into the load compartment.

20. The device of claim 19, wherein the second aperture is one of a plurality of second apertures configured to receive the mixture of warm and cool pressure mediums from the first region into the load compartment.

21. The device of claim 16, further comprising:

a heat shield positioned between the load compartment and an outer wall of the pressure chamber; and a channel configured to receive a mixture of the warm and cool pressure mediums from the first region and direct the received mixture to a second region between the heat shield and the outer wall of the pressure chamber.

22. The device of claim 21, wherein the conduit is configured to receive, at a third height, below the first height, the cool pressure medium from the second region and conduct the cool medium to the mouth.

23. The device of claim 21, wherein the conduit is configured to receive, at a third height, below the first height, cool pressure medium from outside the pressure chamber and conduct the cool medium to the mouth.

24. A device, comprising:

a closable cylindrical pressure chamber;

a cylindrical load compartment positioned coaxially within the pressure chamber;

a first aperture formed in an upper portion of an outer wall of the load compartment and communicating between an interior of the load compartment and a first region surrounding the load compartment; and a conduit extending through the load compartment having a first opening at the first region near a top portion of the load compartment and a second opening at a second region below the load compartment.

25. The device of claim 24, further comprising a second aperture formed in a lower portion of the outer wall of the load compartment and communicating between the interior of the load compartment and the first region surrounding the load compartment.

26. The device of claim 24, further comprising:

a cylindrical heat shield positioned coaxially between the load compartment and a wall of the pressure chamber; and a channel having first and second ends, the first end in communication with the first region near a lower portion of the load compartment, and the second end in communication with an upper portion of a space between the heat shield and the wall of the pressure chamber.

27. The device of claim 26, wherein the channel is cylindrical.

28. The device of claim 26, further comprising an additional channel communicating between a lower portion of the space between the heat shield and the wall of the pressure chamber and the second region.

29. The device of claim 26, wherein the first opening of the conduit is positioned above the first aperture.

30. The device of claim 28, wherein the first opening of the conduit is positioned above the load chamber.

* * * * *

UNITED STATES PATENT AND TRADEMARK OFFICE

CERTIFICATE OF CORRECTION

PATENT NO. : 8,506,284 B2
APPLICATION NO. : 12/656355
DATED : August 13, 2013
INVENTOR(S) : Carl Bergman It is certified that error appears in the above-identified patent and that said Letters Patent is hereby corrected as shown below:

On the Title Page

Item (73) Assignee should read:

(73) Assignee: ~~Flow Holdings GmbH (SAGL) Limited Liability Company, Mezzovico (CH)~~
Avure Technologies AB, Vasteras (SE)

Signed and Sealed this
Sixth Day of May, 2014

Michelle K. Lee
*Deputy Director of the United States Patent and Trademark Office*